United States Patent
Jones et al.

(10) Patent No.: US 11,657,810 B2
(45) Date of Patent: May 23, 2023

(54) QUERY ROUTING FOR BOT-BASED QUERY RESPONSE

(71) Applicant: International Business Machines Corporation, Armonk, NY (US)

(72) Inventors: Steven Ware Jones, Queens, NY (US); Jacob Lewis, New York City, NY (US); Shuai Wang, Sunnyvale, CA (US); Jennifer A. Mallette, Vienna, VA (US); Ruchi Asthana, New York, NY (US); Jia Liu, Astria, NY (US); Vivek Salve, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 16/939,520

(22) Filed: Jul. 27, 2020

(65) Prior Publication Data

US 2022/0028378 A1    Jan. 27, 2022

(51) Int. Cl.
 *G10L 15/22* (2006.01)
 *G10L 15/08* (2006.01)
 (Continued)

(52) U.S. Cl.
 CPC ............ *G10L 15/22* (2013.01); *G06F 16/951* (2019.01); *G06F 16/9532* (2019.01);
 (Continued)

(58) Field of Classification Search
 None
 See application file for complete search history.

(56) References Cited

U.S. PATENT DOCUMENTS

| | | | |
|---|---|---|---|
| 6,757,362 B1 * | 6/2004 | Cooper | H04M 3/527 379/88.16 |
| 7,574,610 B2 * | 8/2009 | Willman | G06F 21/577 726/28 |

(Continued)

OTHER PUBLICATIONS

Joigneau, "Utterances classifier for chatbots' intents", Degree Project in Computer Science and Engineering, Second Cycle, Stockholm, Sweden 2018, 58 pages, KTH Royal Institute of Technology School of Electrical Engineering and Computer Science, Jul. 6, 2018.

(Continued)

*Primary Examiner* — Neeraj Sharma
(74) *Attorney, Agent, or Firm* — Kimberly S. Zillig

(57) ABSTRACT

A method, system, and computer program product for routing queries to answer resources based on component parts and intents of a received query is provided. The method receives a query from a user. The query is analyzed to identify a set of entities associated with the query and generate an utterance representing the query. The method generates an intent classification for the utterance and a vector for the query. The vector is generated based on the set of entities, the utterance, and the intent classification. The method determines an answer resource for the query based on the vector and the intent classification of the query. In response to determining the answer resource, the method provides an answer interface based on the query, the vector, and the intent classification. The answer interface dynamically provides a response to the query.

14 Claims, 7 Drawing Sheets

(51) Int. Cl.
    *G10L 15/30* (2013.01)
    *G06F 16/9532* (2019.01)
    *G06F 16/9538* (2019.01)
    *G06F 16/951* (2019.01)

(52) U.S. Cl.
    CPC .......... *G06F 16/9538* (2019.01); *G10L 15/08* (2013.01); *G10L 15/30* (2013.01); *G10L 2015/221* (2013.01); *G10L 2015/227* (2013.01)

(56) References Cited

U.S. PATENT DOCUMENTS

| | | | |
|---|---|---|---|
| 9,679,568 B1* | 6/2017 | Taubman | G10L 15/22 |
| 9,912,810 B2 | 3/2018 | Segre et al. | |
| 10,003,692 B2 | 6/2018 | Skiba et al. | |
| 11,011,160 B1* | 5/2021 | Villaizan | G10L 25/51 |
| 2004/0044516 A1* | 3/2004 | Kennewick | G10L 15/1822 |
| | | | 704/E15.04 |
| 2005/0033582 A1* | 2/2005 | Gadd | G10L 15/26 |
| | | | 704/E15.04 |
| 2010/0199181 A1* | 8/2010 | Robertson | G06Q 30/02 |
| | | | 715/709 |
| 2013/0304758 A1* | 11/2013 | Gruber | G06F 16/9535 |
| | | | 707/769 |
| 2014/0188477 A1* | 7/2014 | Zhang | G10L 15/22 |
| | | | 704/257 |
| 2014/0229157 A1* | 8/2014 | Leydon | G07F 17/3255 |
| | | | 704/2 |
| 2015/0317302 A1* | 11/2015 | Liu | G06F 40/40 |
| | | | 704/9 |
| 2017/0242886 A1 | 8/2017 | Jolley et al. | |
| 2017/0295114 A1 | 10/2017 | Goldberg et al. | |
| 2017/0324868 A1 | 11/2017 | Tamblyn et al. | |
| 2017/0366479 A1 | 12/2017 | Ladha et al. | |
| 2018/0054464 A1 | 2/2018 | Zhang et al. | |
| 2018/0189273 A1 | 7/2018 | Campos et al. | |
| 2018/0196796 A1 | 7/2018 | Wu | |
| 2018/0287968 A1 | 10/2018 | Koukoumidis et al. | |
| 2018/0322403 A1 | 11/2018 | Ron et al. | |
| 2018/0349754 A1 | 12/2018 | Kumar et al. | |
| 2019/0103099 A1* | 4/2019 | Panainte | G10L 15/063 |
| 2019/0176820 A1* | 6/2019 | Pindeus | G06V 40/25 |
| 2020/0279002 A1* | 9/2020 | Kim | G10L 15/18 |
| 2021/0365834 A1* | 11/2021 | Sivasankar | G06N 20/00 |

OTHER PUBLICATIONS

Katsalis, "Predicting User's Intent from Text using Machine Learning Methods", International Hellenic University, School of Science & Technology, A thesis submitted for the degree of, Master of Science (MSc) in Data Science, Nov. 2018, 60 pages.

Mnasri, "Recent advances in conversational NLP: Towards the standardization of Chatbot building", arXiv:1903.09025v1 [cs.CL], Mar. 21, 2019, 8 pages.

Mell et al., "The NIST Definition of Cloud Computing", Recommendations of the National Institute of Standards and Technology, Special Publication 800-145, Sep. 2011, 7 pages.

* cited by examiner

QUERY ROUTING FOR BOT-BASED QUERY RESPONSE

BACKGROUND

Websites often provide functionality for and receive queries from visitors. Systems attempt to provide suitable query responses to provide visitors with information requested and suitable interactions. Some approaches to query routing and response involve pre-chat surveys prior to providing responses or routing queries. Some approaches attempt to route visitors based on strategies such as pure topic-based routing. Some approaches use confidence polling of failed results from chat bots to route future visitor queries. Some approaches fuse responses from multiple chat bots to provide query responses with variability in effort to provide at least one suitable response to a query.

SUMMARY

According to an embodiment described herein, a computer-implemented method for routing queries to answer resources is provided. The method receives a query from a user. The query is analyzed to identify a set of entities associated with the query and generate an utterance representing the query. The method generates an intent classification for the utterance and a vector for the query. The vector is generated based on the set of entities, the utterance, and the intent classification. The method determines an answer resource for the query based on the vector and the intent classification of the query. In response to determining the answer resource, the method provides an answer interface based on the query, the vector, and the intent classification. The answer interface dynamically provides a response to the query.

According to an embodiment described herein, a system for routing queries to answer resources is provided. The system includes one or more processors and a computer-readable storage medium, coupled to the one or more processors, storing program instructions that, when executed by the one or more processors, cause the one or more processors to perform operations. The operations receive a query from a user. The query is analyzed to identify a set of entities associated with the query and generate an utterance representing the query. The operations generate an intent classification for the utterance and a vector for the query. The vector is generated based on the set of entities, the utterance, and the intent classification. The operations determine an answer resource for the query based on the vector and the intent classification of the query. In response to determining the answer resource, the operations provide an answer interface based on the query, the vector, and the intent classification. The answer interface dynamically provides a response to the query.

According to an embodiment described herein a computer program product for routing queries to answer resources is provided. The computer program product includes a computer readable storage medium having program instructions embodied therewith, the program instructions being executable by one or more processors to cause the one or more processors to receive a query from a user. The query is analyzed to identify a set of entities associated with the query and generate an utterance representing the query. The computer program product generates an intent classification for the utterance and a vector for the query. The vector is generated based on the set of entities, the utterance, and the intent classification. The computer program product determines an answer resource for the query based on the vector and the intent classification of the query. In response to determining the answer resource, the computer program product provides an answer interface based on the query, the vector, and the intent classification. The answer interface dynamically provides a response to the query.

DETAILED DESCRIPTION

Figure 1:
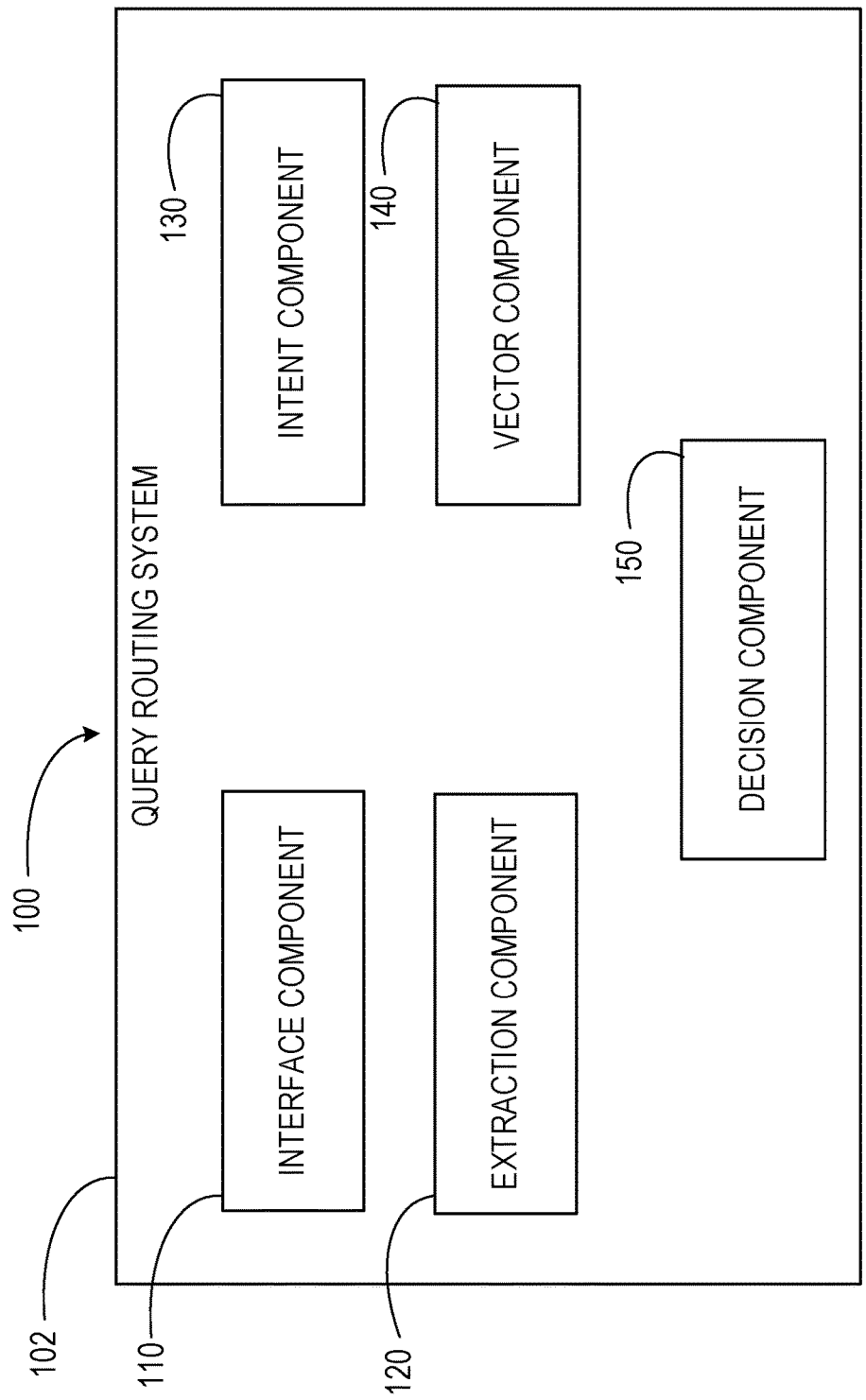
FIG. 1 depicts a block diagram of a computing environment for implementing concepts and computer-based methods, according to at least one embodiment.

The present disclosure relates generally to methods for query routing. More particularly, but not exclusively, embodiments of the present disclosure relate to a computer-implemented method for routing queries to chat bots based on intents and entities of the query. The present disclosure relates further to a related system for query routing, and a computer program product for operating such a system.

People use networked resources, such as the Internet, daily. From asking general and specific knowledge questions to researching products and services, people access a wide variety of web pages to answer any number of questions. For example, thousands of individuals visit landing pages of a company on a daily basis, driven by curiosity, advertising campaigns, troubleshooting company products, and many other reasons. Landing pages may be an initial page, dedicated to a specific product, system, campaign, or offering of a company, to which network traffic is directed from certain search engines, email offers, advertisements, or other suitable network traffic routing methods. Often visitors have a general idea of the information for which they are searching, but may benefit from additional ways to pinpoint the information they seek. If a visitor is confused by information on a landing page of a company, the visitor may leave the website without finding the applicable information. Individualized personal attention may not be suitable or feasible to answer each user's query.

Landing pages are often built with broad content due to the diversity of incoming web traffic. Visitors navigating a website from a landing page may encounter difficulty deciding where or how to proceed, depending on the layout of the website or landing page. Visitors are often presented with search bars within a website, such as general text entry fields. These search bars may engage web crawlers or otherwise scrape information from the website to provide search results to visitors. Visitors using search bars often receive results too granular to be readily used. When visitors have general questions, some prefer to be directed to common portals, such as support pages or common topic pages. Visitors with more specific requests may prefer to be directed to specific product or service pages, or may prefer to be transferred to agents (e.g., virtual or human) better suited to answer detailed questions rather than more generalized pages. Visitors interacting with virtual agents may enter varied queries, expecting relevant answers.

However, current systems which respond to visitor queries often provide granular results similar to web searches, thereby lacking suitable contextual intelligence in responses. Similarly, response systems involving agents, virtual or human, often lack contextual intelligence in routing queries to appropriate agents. Such systems fail to route off-topic queries to agents suitably trained or otherwise informed prior to the user interaction to answer a given query.

Embodiments of the present disclosure enable topic and intent based routing to answer resources. The present disclosure describes intelligent detection of visitor intent and query content to route queries to general, specific, or off-topic resources to provide relevant answers to user queries. Embodiments of the present disclosure describe a routing engine to identify customer intent and content with a high threshold of relevance.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a query routing system 102. The query routing system 102 may comprise an interface component 110, an extraction component 120, an intent component 130, a vector component 140, and a decision component 150. The interface component 110 receives user input and provides presentation of user interface elements associated with the query routing system 102. The extraction component 120 extracts entities and values from queries, and generates utterances from received queries. The intent component 130 determines intent classifications for utterances generated from received queries. The vector component 140 generates vectors from received queries. The decision component 150 determines answer resources for received queries. Although described with distinct components, it should be understood that, in at least some embodiments, components may be combined or divided, and/or additional components may be added, without departing from the scope of the present disclosure.

Figure 2:
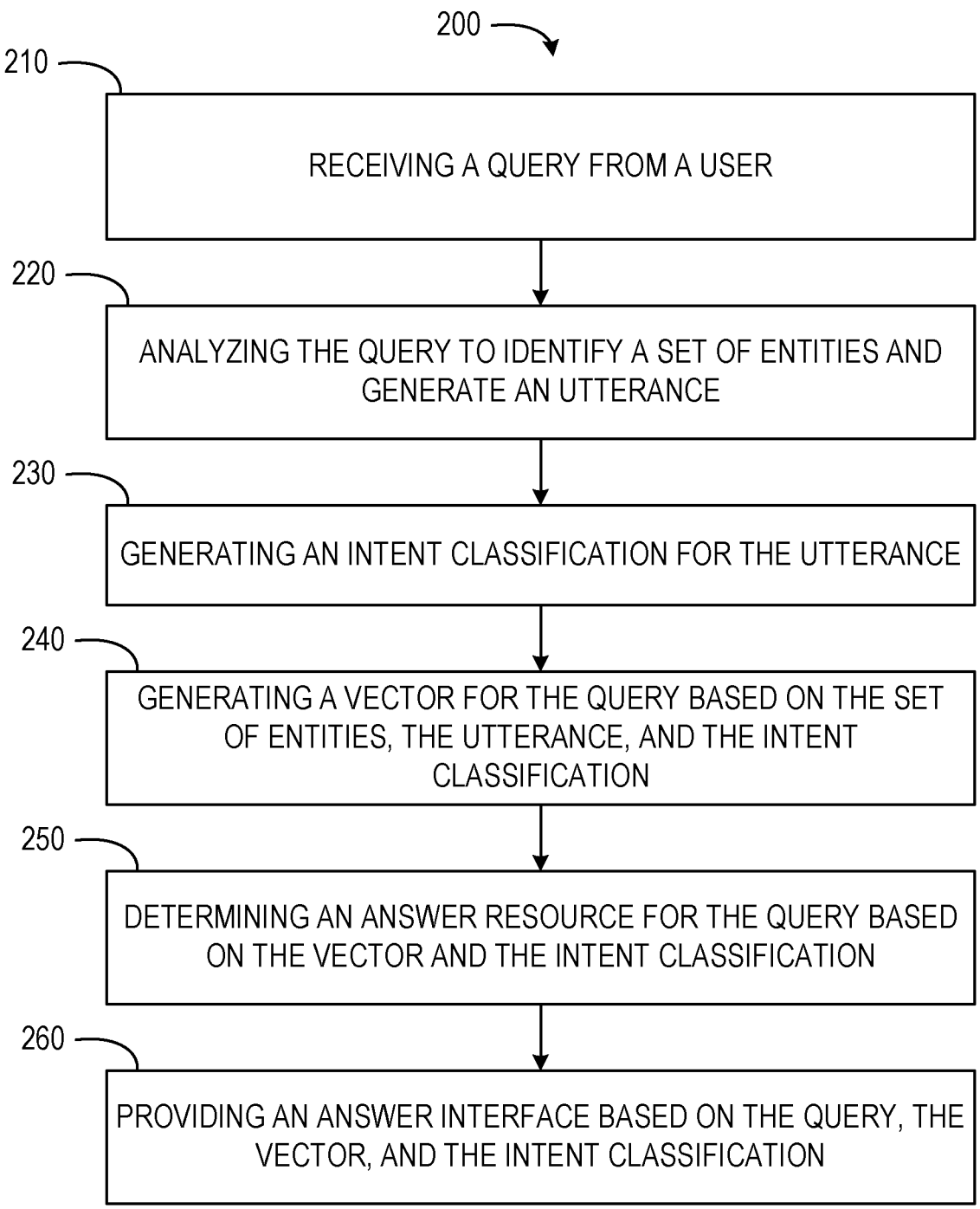
FIG. 2 depicts a flow diagram of a computer-implemented method for routing queries to answer resources based on component parts and intents of a received query, according to at least one embodiment.

Referring now to FIG. 2, a flow diagram of a computer-implemented method 200 is shown. The computer-implemented method 200 is a method for routing queries to answer resources based on components parts and intents of a received query. In some embodiments, the computer-implemented method 200 may be performed by one or more components of the computing environment 100, as described in more detail below.

At operation 210, the interface component 110 receives a query from a user. In some embodiments, a user interacts with a network resource at a resource address. The user may interact with the network resource through a user interface including a browser. The user may interact with a text entry field presented within the user interface. The text entry field may be a user interface element for a bot accessible through the browser or the user interface. The bot may receive the query as a natural language query. The bot, as part of the interface component 110 or using the interface component 110, may pass the query to one or more components of the query routing system 102. These components may analyze the query and route the query to an appropriate answer resource. The answer resource may be a relevant bot, chat bot, agent, or any other relevant resource capable of providing a suitable response to the query based on how the user engages bots using natural language.

At operation 220, the extraction component 120 analyzes the query. In some embodiments, the extraction component 120 analyzes the query to identify a set of entities associated with the query. The set of entities may be identified using natural language processing, machine learning, or any other suitable manner. The extraction component 120 may analyze the query to generate an utterance representing the query. In some embodiments, the utterance is generated based on the query and the set of entities associated with or occurring within the query. The extraction component 120 then passes the set of entities, or representations thereof, and the utterance to one or more components of the query routing system 102 to continue analysis and routing of the query.

In some embodiments, the extraction component 120 analyzes the query by identifying a set of values associated with a subset of entities of the set of entities. The extraction component 120 may act as an entity tagger, recognizing entities for the query based on values to which the entities are mapped. For example, entities may be products and services of a company, knowledge topics of an information repository, or any other suitable topics relevant to a networked resource. Each entity may be associated with or mapped to specified values. The values may be characters, numerals, strings, phrases, or any other suitable values capable of describing or defining concepts or topics of the networked resource. In some embodiments, the extraction component 120 identifies the set of values by parsing the query using natural language processing to identify characters, n-grams, words, phrases, and syntax within the query.

The extraction component 120 identifies the query entities from the subset of entities. The query entities may be identified in response to identifying the set of values. In some instances, the extraction component 120 compares the identified values (e.g., characters, n-grams, words, and phrases) with a dictionary or other value repository to identify entities associated with the values. For example, the extraction component 120 may analyze the query to identify values such as "SPSS," mapping to an entity "Product," and "V25," mapping to an entity "Version." The extraction component 120 may identify the entities "Product" and "Version" as the subset of entities for the query. In some instances, the extraction component 120, identifying the subset of entities, may identify one or more entities, associated with the subset of entities, to add additional entities to form the set of entities. The name-value pairs of entities and values may be passed by the extraction component 120 to one or more components of the query routing system 102 to complete analysis and routing of the query.

At operation 230, the intent component 130 generates an intent classification for the utterance. The intent classification may represent an intent of the utterance and the overall query, devoid of particular keywords relating to the values and entities. In some embodiments, the intent classification informs the query routing system 102 of the intent of a user. For example, a user may enter a query with values representing a first and second entities. The intent classification of the utterance surrounding the values of the first and second entities may differentiate the query as one of asking a question for more information about the first and second entities and one of asking a question about another topic relative to one or more of the first and second entities.

The intent classification may initially include classifiers. The classifiers may be trained with a portion of the data, with certain classes of data combined. For example, a binary classifier may be used. The binary classifier may be built by combining all existing intents into two intents, on-topic and off-topic. As such, the binary classification may be divided into on-topic and off-topic classifications. On-topic classifications may be understood as classifications of topics relating to a business, person, website, or other body associated with or implementing the query routing system 102. The on-topic classifier may be a classifier trained on product-centered chat bots' intent data (e.g., data associated with users interacting with a chat bot of the body implementing the query routing system 102). Off-topic classifications may be understood as classifications of topics unrelated to the body associated with. In some embodiments, a trinary or n-class classification may be used, depending on implementation characteristics of the query routing system 102 for the body. Examples of binary intent classifiers may include classifiers intended to distinguish between sales and support. Other examples of intent classifiers may be intended to distinguish between audiences such as developers, managers, or investors.

In embodiments where the intent classification includes a binary classifier, the on-topic classifier may be a classifier trained on product-centered chat bots' intent data (e.g., data associated with users interacting with a chat bot of the body implementing the query routing system 102). The chat bots' intent data may be based on identifying common intents of users. The off-topic classifier may be trained on general question data sets or data sets relating to topics other than those of the on-topic classifier. For example, an off-topic classifier may be trained on weather data, questions about celebrities, questions about food, combinations thereof, or any other suitable off-topic subjects. When generating intent classifications of on-topic or off-topic, the intent component 130 may cooperate with other components of the query routing system 102, using the utterance to inform routing of the query. For example, if an utterance was classified as an off-topic intent, but included on-topic entities, the off-topic intent data may be determined to be noise, in some instances.

In some embodiments, the intent component 130 normalizes the utterance. The utterance may be normalized by replacing the portions of the utterance with entity names. In some embodiments, the set of values in the utterance are replaced with one or more entity name of the query entities. For example, where the query is "John purchased company X SPSS today," the intent component 130 may normalize the utterance to read "<Person> purchased <product> today." Normalization of the utterance may preclude bias during intent classification. The intent component 130 may generate the intent classification by determining a topic for the utterance. The topic for the utterance may be based on one or more of the utterance and the query entities.

In some embodiments, the intent component 130 determines one or more answer resources associated with the topic. The answer resources may be identified as bots, human agents, or other resources capable of responding suitably to a query. In some embodiments, the intent component 130 determines answer resources based on entities and intents associated with the one or more answer resources. Answer resources may be associated with a data table or data repository. The data table or data repository may contain strings, values, entities, or intents associated with the respective answer resources. The intent component 130 may compare the topic, the query entities, or the values with the data table or data repository to determine the one or more answer resources.

At operation 240, the vector component 140 generates a vector for the query. In some embodiments, the vector may be generated based on the set of entities, the utterance, and the intent classification. The vector may also be generated based on one or more of the set of entities, the utterance, and the intent classification, without using all of the above-referenced elements. The vector may be generated as a tuple. In some instances, the tuple contains a class label and a confidence value for a class represented by the class label. For example, the normalized utterance of "<Person> purchased <product> today" may receive a bot specific intent label of "Purchase." The normalized utterance may also receive a general label of "On-topic." In some embodiments, the confidence score may be associated with each bot specific intent label. For example, the bot specific intent label of "Purchase" may be generated with a confidence score of 0.9. The general label of "On-topic" may be generated with a confidence score of 0.8. The vector may be generated as a combined vector of the tuples for the bot specific intent and the general label to generate a combined vector. For example, the combined vector may be generated as < . . . , ("Purchase", 0.9), ("On-topic", 0.8), . . . >.

At operation 250, the decision component 150 determines an answer resource for the query. In some embodiments, the answer resource is determined based on the vector and the intent classification of the query. The decision component may place priorities on varying inputs to prevent routing on-topic queries to off-topic bots or answer resources. In some embodiments, the decision component 150 determines the answer resource using one or more confidence thresholds for different classes. The varying confidence thresholds may be based on heuristic data or any suitable data or data type.

In some embodiments, the decision component 150 determines the answer resource for the query by identifying a resource address associated with content being presented to the user when the query was received. The resource address may be a uniform resource locator (URL) for a webpage presented to the user during a time the user enters the query. The decision component 150 may determine the resource address in response to receiving the query. The decision component 150 may determine a topic of the resource address. For example, the topic may be a product, a service, a company, or any other suitable grouping of information associated with the resource address.

The decision component 150 may determine the topic of the resource address using a page-topic entity engine. The page-topic entity engine may identify the topic of the resource address in an off-line process, at a time when the query is being entered into the user interface, or when the browser navigates to the resource address, or while loading information from the resource address to the browser or user interface. Each resource address may be associated with one or more name-value pairs. Multiple resource addresses may have their topics and name-value pairs determined by the decision component 150. The name-value pairs of a plurality of resource addresses (e.g., resource addresses for individual webpages of a company's website) may be included in a single name-value pair list.

Where the resource address is identified, the answer resource for the query is determined based on the vector, the intent classification of the query, and the resource address or the name-value pairs for the resource address. In some embodiments, the decision component 150 compares portions of the vector and intent classification to the name-value pairs of the resource address. Where the name-value pairs of the resource address match portions of the vector and the intent classification, the decision component 150 may determine the answer resource is associated with the resource address. Where the name-value pairs of the resource address fail to match portions of the vector and the intent classification, the decision component 150 may identify one or more alternative name-value pairs, from the name-value pair list, which match the portions of the vector and the intent classifications. The one or more alternative name-value pairs may be associated with alternative resource addresses with a topic or bots capable of providing a suitable answer to the query. In some embodiments, the decision component 150 uses the entities (e.g., name-value pairs), vectors, intent classifications, and page topic as input with threshold-based routing rules to pass the query to a suitable bot, representative, or other answer resource.

In some embodiments, the intent component 130 determines the query to have an on-topic intent. Given the input of the intent classification, the vector, and the query entities, the decision component 150 may operate as a decision tree-based router. The decision component 150 may determine whether the query can be answered using an on-topic bot based on the intent, the topic, and the entities. Where the bot is incapable of answering the query, the decision component 150 may apply a similar process to determine whether another answer resource (e.g., a human agent) is capable of answering the query. In some embodiments, where a human agent is unavailable, the decision component 150 uses the intent classifier and entities to query additional data repositories to display additional information to the user or troubleshoot an error or insufficiently understood query.

In some embodiments, the intent component 130 determines the query to be off-topic. Where no on-topic entity is identified (e.g., only off-topic entities are identified), the intent component 130 may identify an on-topic intent for the utterance and query. In such instances, the query operates as described above with a current resource address used when the query was received.

In some embodiments, the intent component 130 determines the query to be off-topic, with no on-topic entities and no on-topic intents. The decision component 150 may identify one or more off-topic bots matching the identified intents and entities, in a manner similar to or the same as described above. If a suitable off-topic bot is identified, the query is routed to the off-topic bot and the decision component 150 passes an indicator to the interface component 110. If the decision component 150 fails to identify an off-topic bot capable of answering the query, the decision component 150 may apply a similar process to determine whether another answer resource, such as a human agent, is capable of answering the query. Where a human agent is unavailable, the decision component 150 may identify additional information from additional data repositories to display the additional information to the user.

At operation 260, the interface component 110 provides an answer interface based on the query, the vector, and the intent classification. The answer interface may dynamically provide a response to the query. The response may be dynamically provided such that the response may include a collection of information that the user interface may not have previously stored or otherwise have access to as a predetermined response. In some embodiments, the answer interface is provided in response to determining the answer resource. Where the decision component 150 determines the resource address presented to the user at the time of receiving the query, the resource address may be a first resource address. The interface component 110, in providing the answer interface, may redirect a browser of the user to a second resource address. The interface component 110 then provides the answer interface at the second resource address.

Figure 3:
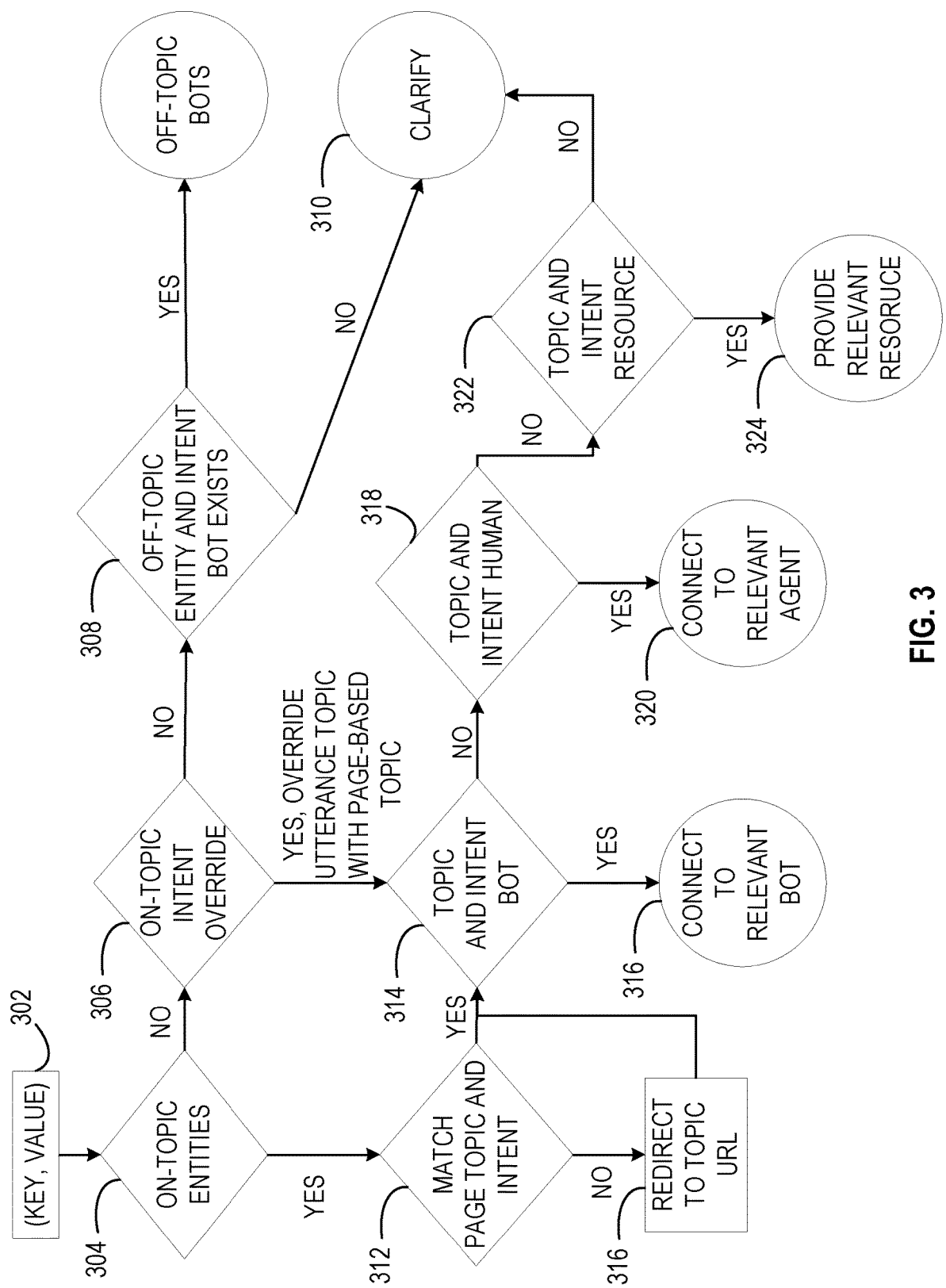
FIG. 3 depicts a flow diagram of a computer-implemented method for routing queries to answer resources based on component parts and intents of a received query, according to at least one embodiment.

FIG. 3 shows a flow diagram of an embodiment of a computer-implemented method 300 for routing queries to answer resources based on component parts and intents of a received query. The method 300 may be performed by or within the computing environment 100. In some embodiments, the method 300 comprises or incorporates one or more operations of the method 200. In some instances, operations of the method 300 may be incorporated as part of or sub-operations of the method 200, such as operation 250.

In operation 302, a processed query may be passed to the decision component 150. The processed query may include a vector comprising a confidence score and a class of the query; an entity including a key and value; and a page URL. In operation 304, the decision component 150 determines whether the entity of the query is on-topic. If the decision component 150 determines the entity is not on topic, the decision component 150 proceeds to operation 306. In operation 306, the decision component 150 determines if the query has an on-topic intent. Where the intent is not on-topic, the decision component 150 proceeds to operation 308. In operation 308, the decision component 150 determines whether a resource or bot exists for off-topic entity and intent. The resource for the off-topic entity and intent may be a general resource or chat bot. In some embodiments, the decision component 150 matches the topic of the entity and intent with an available bot. Where the decision component 150 determines a resource or bot for off-topic entities and intents exists, the decision component 150 may pass the query to the resource or bot. Where the decision component 150 determines no suitable or relevant resource or bot for off-topic entities and intents exists, the decision component 150 may proceed to operation 310. In operation 310, the decision component 150 cooperates with one or more components of the query routing system 102 to generate and present one or more clarification questions to a user within a user interface.

In some embodiments, if the decision component 150 determines the entity is on-topic, in operation 304, the decision component 150 proceeds to operation 312. In operation 312, the decision component 150 determines if the entity matches a topic and intent of a current URL of the browser. The decision component 150 may compare the one or more of the name and value pair to metadata for or keywords associated with the current URL. Where the decision component 150 determines the topic and intent match between the entity and the current URL, the decision component 150 may proceed to operation 314. In some embodiments, where the decision component 150 determines no topic and intent match occurred between the entity and the current URL, in operation 316, the decision component 150 may redirect the browser to a subsequent URL. The subsequent URL may be a URL which matches one or more of the topic and intent of the query. Once the decision component 150 redirects the browser to the subsequent URL, the decision component 150 may proceed to operation 314.

In operation 314, the decision component 150 determines whether a resource or bot exists for the on-topic entity and intent. The resource for the on-topic entity and intent may be a resource or chat bot trained with relevant knowledge on the topic and intent of the query. Where the decision component 150 matches the topic and intent with a resource or bot, the decision component 150 proceeds to operation 316. In operation 316, the decision component 150 connects to the resource or bot and transfers the query or portions thereof to the resource or bot. In some embodiments, in operation 304, where an on-topic intent is identified by the decision component 150 may enact an intent override. In such embodiments, the decision component 150 overrides an utterance topic with a page-based topic, based on the intent. The decision component 150 then proceeds to operation 314.

In embodiments where the decision component 150 does not identify a resource or bot matching the topic and intent, in operation 314, the decision component 150 proceeds to operation 318. In operation 318, the decision component 150 determines whether a suitable or relevant human agent exists to respond to the query based on the intent and topic. The decision component 150 may determine the human agent exists by comparing the entity name and value or intent and topic with information, such as a profile, for the human agent. When the decision component 150 identifies a relevant human agent, the decision component 150 passes the query to the human agent at operation 320. Where the decision component 150 determines no relevant human agent exists, the decision component 150 proceeds to operation 322. In operation 322, the decision component 150 determines whether a topic or intent resource exists. The topic or intent resource may be a network resource, such as a database, a webpage, or other suitable data repository accessible to the decision component 150. The decision component 150 may identify a relevant topic or intent resource by comparing name and value pairs or components of the query with information within or metadata for the resource. Where the decision component 150 identifies a topic or intent resource, the decision component 150 provides the resource as a response to the query in operation 324. Where the decision component 150 identifies no topic or intent resource relevant to the query, the decision component cooperates with one or more other components of the query routing system 102 to generate and present one or more clarification questions to a user within a user interface at operation 310.

Figure 4:
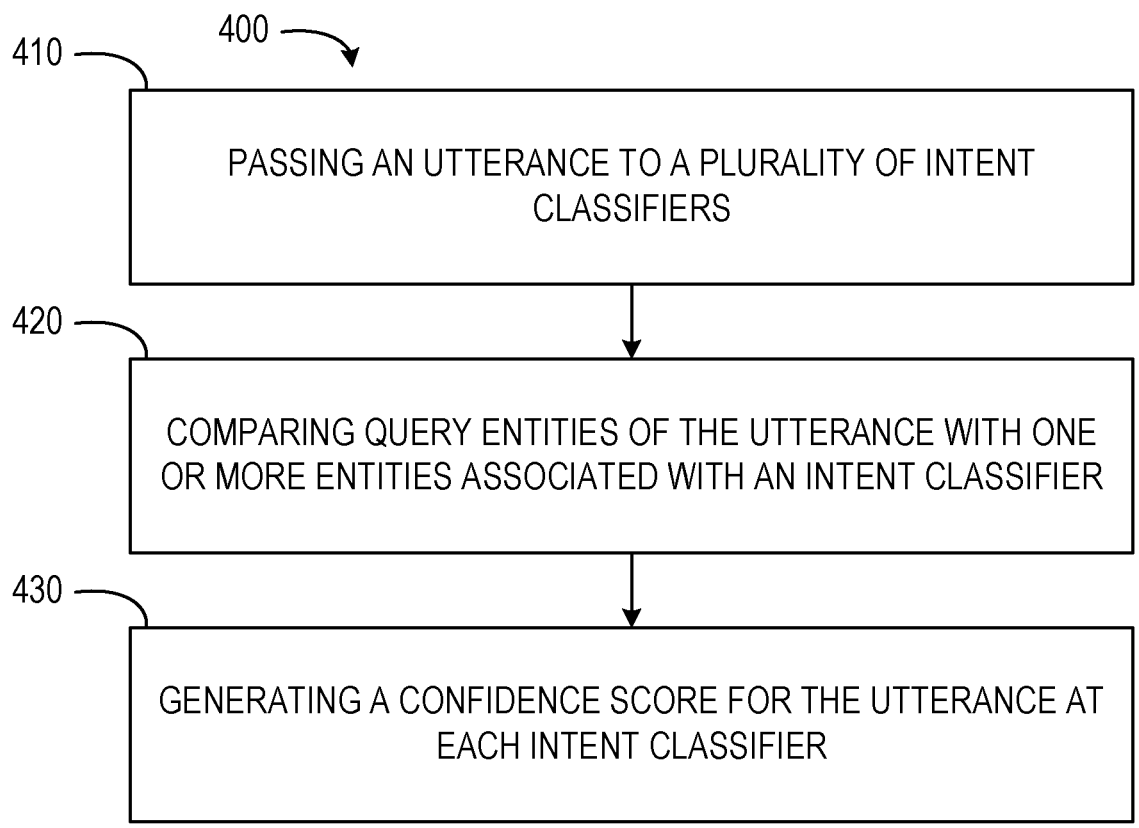
FIG. 4 depicts a flow diagram of a computer-implemented method for routing queries to answer resources based on component parts and intents of a received query, according to at least one embodiment.

FIG. 4 shows a flow diagram of an embodiment of a computer-implemented method 400 for routing queries to answer resources based on component parts and intents of a received query. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the intent component 130 passes an utterance to a plurality of intent classifiers. In some embodiments, the intent component 130 identifies the intent of the utterance, using the plurality of intent classifiers, in a manner similar to that described above with respect to operation 230. The intent component 130, using the plurality of intent classifiers, may identify a plurality of intents for the single utterance.

In operation 420, each intent classifier, of the plurality of intent classifiers, compare query entities of the utterance with one or more entities associated with the intent classifier. In some embodiments, each intent classifier may be associated with a single topic. Each intent classifier may be associated with a plurality of topics, such as a class or group of topics. The intent classifiers may identify one or more of the entities for that classifier that match the query entities of the utterance. In some embodiments, each intent classifier determines both matching entities and mismatched entities associated with the intent classifier.

In operation 430, each intent classifier generates a confidence score for the utterance. The confidence score may be based on comparing the query entities with the one or more entities associated with the intent classifier performing the comparison. In some embodiments, the confidence score is generated based on a number of entities, for the intent classifier generating the score, that match the query entities. In some instances, the confidence score is generated based on a percentage match between query entities and specified entities of the intent classifier.

In some embodiments, the plurality of intent classifiers each cooperate with the vector component 140 to generate a vector. The vectors for each intent classifier may be generated in a manner similar to or the same as described above with respect to operation 240.

The plurality of intent classifiers may further inform other components of the query routing system 102. For example, the scrubbed or normalized utterance may be passed to multiple intent classifiers in parallel. A multi-classifier approach enable an intent of an utterance to be clarified. For example, if an utterance is classified as an off-topic intent but with on-topic entities, the off-topic intent data may become noise. Sending the utterance to on-topic and off-topic intent classifiers (e.g., the plurality of intent classifiers) may remove noise or override incorrectly identified noise. The normalized utterances may be sent to intent classifiers trained as on-topic classifiers and off-topic classifiers. The on-topic classifiers may also be divided into intent classifiers trained on a subset of on-topic data. In some embodiments, intent classifiers may be trained on intents formed from unions of sub-classifiers.

Figure 5:
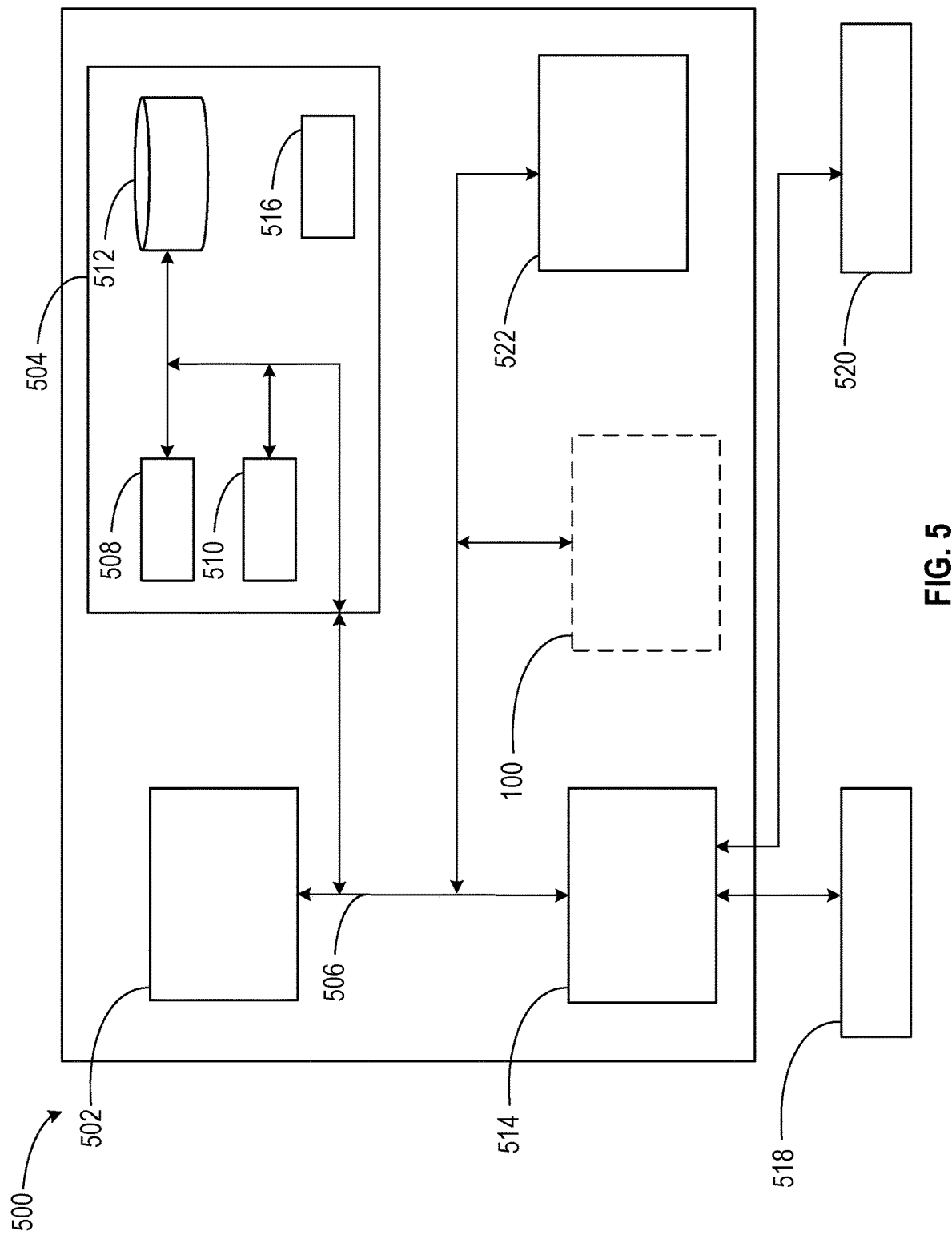
FIG. 5 depicts a block diagram of a computing system for routing queries to answer resources based on component parts and intents of a received query, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for routing queries to answer resources based on components parts and intents of a received query.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the interface component 110, the extraction component 120, the intent component 130, the vector component 140, and the decision component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
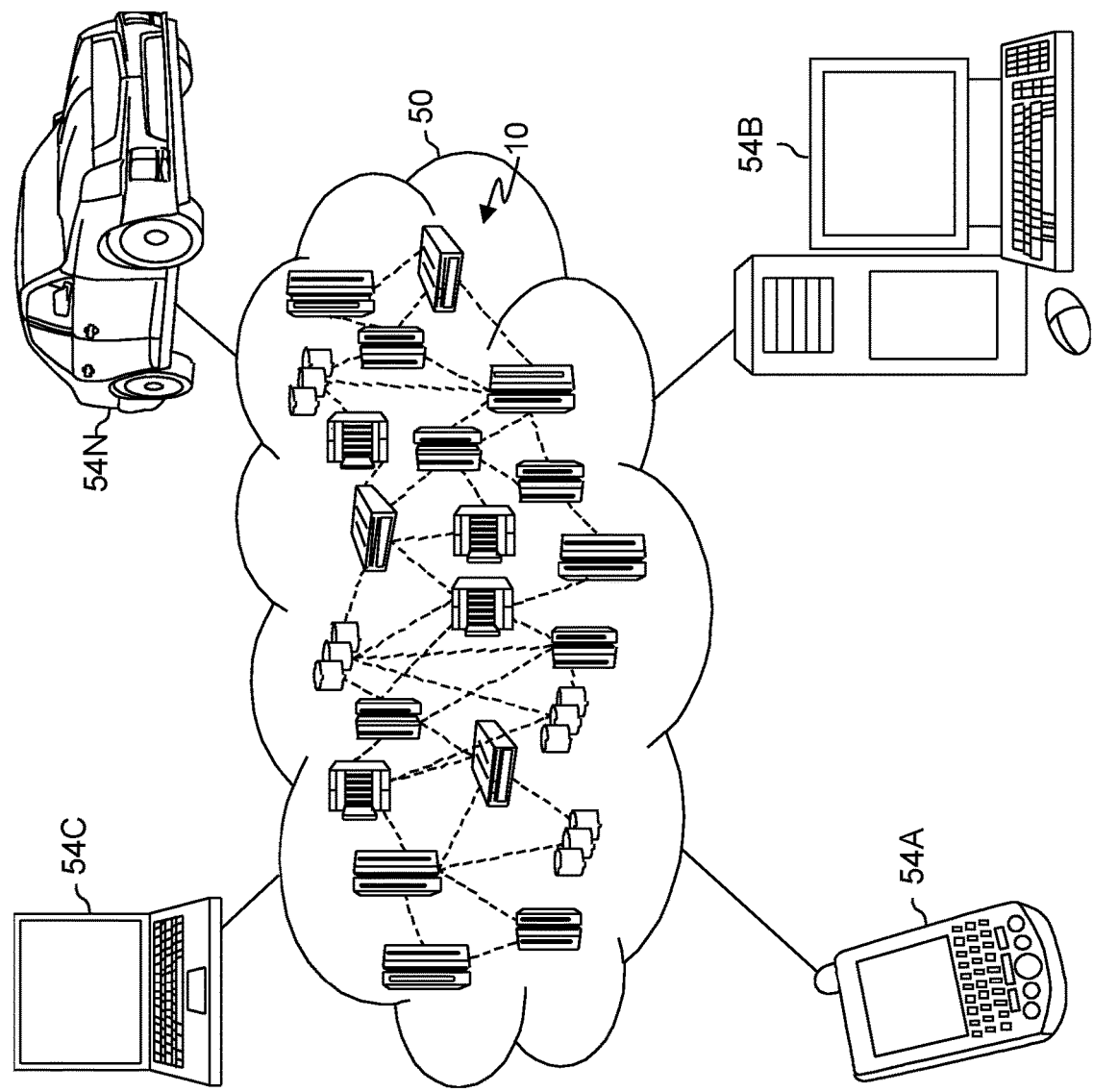
FIG. 6 is a schematic diagram of a cloud computing environment in which concepts of the present disclosure may be implemented, in accordance with an embodiment of the present disclosure.
Figure 7:
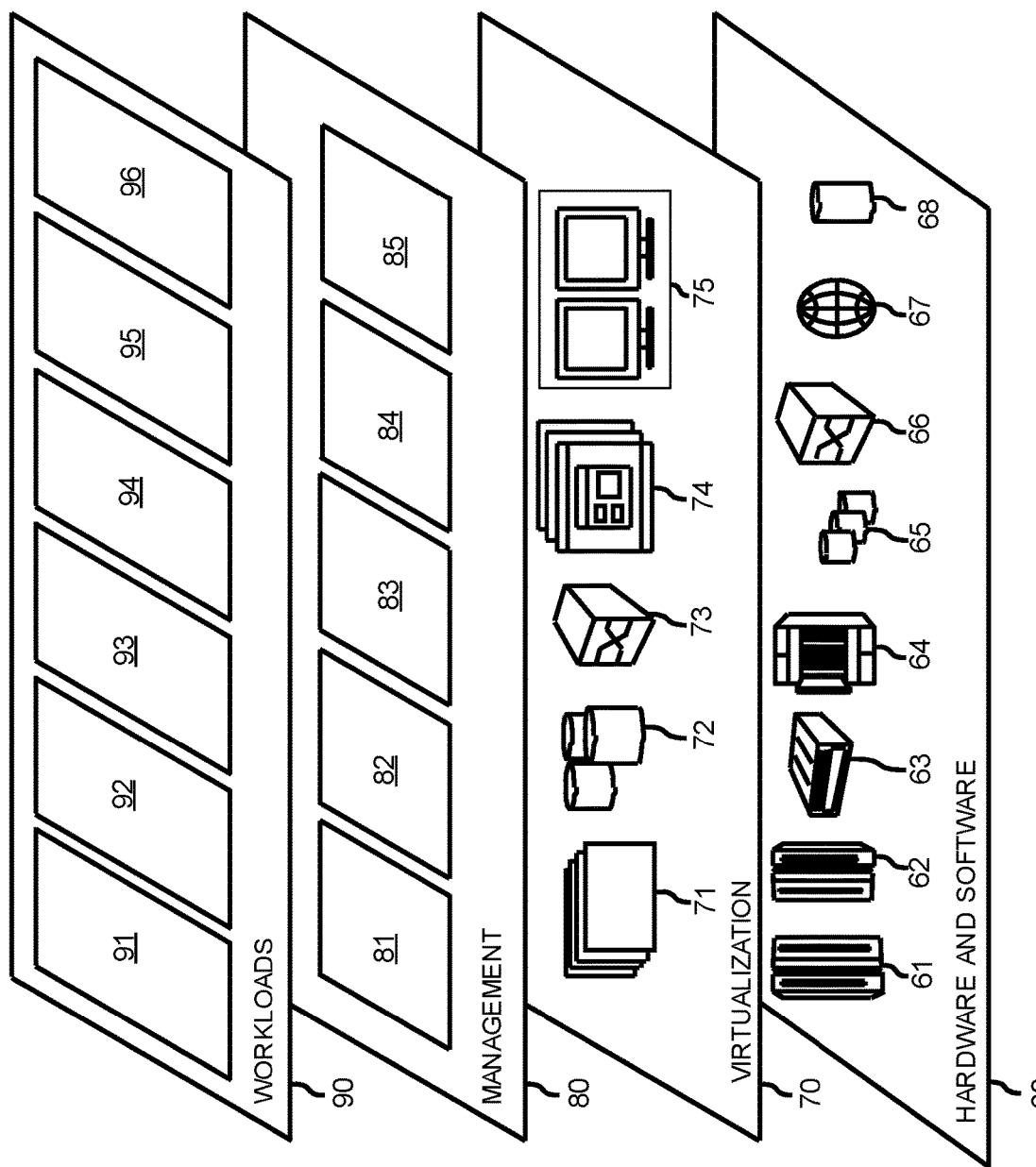
FIG. 7 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a query from a user;
    analyzing the query to identify a set of entities associated with the query and generate an utterance representing the query;
    identifying a set of values associated with a subset of entities of the set of entities, in response to identifying the set of values;
    identifying query entities from the subset of entities;
    passing the utterance to a plurality of intent classifiers;
    generating an intent classification for the utterance based on the plurality of intent classifiers and a comparison of the set of entities with entities associated with the plurality of intent classifiers,
        each intent classifier comparing the query entities of the utterance with one or more entities associated with the intent classifier, and
        each intent classifier generating a confidence score for the utterance based on comparing the query entities with the one or more entities associated with the intent classifier;
    generating a vector for the query based on the set of entities, the utterance, and the intent classification;
    determining an answer resource for the query based on the vector and the intent classification of the query; and
    in response to determining the answer resource, providing an answer interface based on the query, the vector, and the intent classification such that the answer interface dynamically provides a response to the query.

2. The computer-implemented method of claim 1, wherein the utterance is normalized to replace the set of values with an entity name of the query entities, and generating the intent classification further comprises:
    determining a topic for the utterance based on one or more of the utterance and the query entities; and
    determining one or more answer resources associated with the topic.

3. The computer-implemented method of claim 1, wherein the vector is a tuple containing a class label and a confidence value for a class represented by the class label.

4. The computer-implemented method of claim 1, further comprising:
    in response to receiving the query, identifying a resource address associated with content being presented to the user when the query was received; and
    wherein the answer resource for the query is determined based on the vector, the intent classification of the query, and the resource address.

5. The computer-implemented method of claim 4, wherein the resource address is a first resource address, and wherein providing the answer interface further comprises:
    redirecting a browser of the user to a second resource address; and
    providing the answer interface at the second resource address.

6. A system, comprising:
    one or more processors; and
    a computer-readable storage medium, coupled to the one or more processors, storing program instructions that, when executed by the one or more processors, cause the one or more processors to perform operations comprising:
    receiving a query from a user;
    analyzing the query to identify a set of entities associated with the query and generate an utterance representing the query;
    identifying a set of values associated with a subset of entities of the set of entities, in response to identifying the set of values;
    identifying query entities from the subset of entities;
    passing the utterance to a plurality of intent classifiers;

generating an intent classification for the utterance based on the plurality of intent classifiers and a comparison of the set of entities with entities associated with the plurality of intent classifiers, each intent classifier comparing the query entities of the utterance with one or more entities associated with the intent classifier, and each intent classifier generating a confidence score for the utterance based on comparing the query entities with the one or more entities associated with the intent classifier;

generating a vector for the query based on the set of entities, the utterance, and the intent classification;

determining an answer resource for the query based on the vector and the intent classification of the query; and in response to determining the answer resource, providing an answer interface based on the query, the vector, and the intent classification, the answer interface dynamically providing a response to the query.

7. The system of claim 6, wherein the utterance is normalized to replace the set of values with an entity name of the query entities, and generating the intent classification further comprises:

determining a topic for the utterance based on one or more of the utterance and the query entities; and determining one or more answer resources associated with the topic.

8. The system of claim 6, wherein the vector is a tuple containing a class label and a confidence value for a class represented by the class label.

9. The system of claim 6, wherein the operations further comprise:

in response to receiving the query, identifying a resource address associated with content being presented to the user when the query was received; and wherein the answer resource for the query is determined based on the vector, the intent classification of the query, and the resource address.

10. The system of claim 9, wherein the resource address is a first resource address, and wherein providing the answer interface further comprises:

redirecting a browser of the user to a second resource address; and providing the answer interface at the second resource address.

11. A computer program product comprising a computer readable storage medium having program instructions embodied therewith, the program instructions being executable by one or more processors to cause the one or more processors to perform operations comprising:

receiving a query from a user;

analyzing the query to identify a set of entities associated with the query and generate an utterance representing the query;

identifying a set of values associated with a subset of entities of the set of entities, in response to identifying the set of values;

identifying query entities from the subset of entities;

passing the utterance to a plurality of intent classifiers;

generating an intent classification for the utterance based on the plurality of intent classifiers and a comparison of the set of entities with entities associated with the plurality of intent classifiers, each intent classifier comparing the query entities of the utterance with one or more entities associated with the intent classifier, and each intent classifier generating a confidence score for the utterance based on comparing the query entities with the one or more entities associated with the intent classifier;

generating a vector for the query based on the set of entities, the utterance, and the intent classification;

determining an answer resource for the query based on the vector and the intent classification of the query; and in response to determining the answer resource, providing an answer interface based on the query, the vector, and the intent classification, the answer interface dynamically providing a response to the query.

12. The computer program product of claim 11, wherein the utterance is normalized to replace the set of values with an entity name of the query entities, and generating the intent classification further comprises:

determining a topic for the utterance based on one or more of the utterance and the query entities; and determining one or more answer resources associated with the topic.

13. The computer program product of claim 11, wherein the operations further comprise:

in response to receiving the query, identifying a resource address associated with content being presented to the user when the query was received; and wherein the answer resource for the query is determined based on the vector, the intent classification of the query, and the resource address.

14. The computer program product of claim 13, wherein the resource address is a first resource address, and wherein providing the answer interface further comprises:

redirecting a browser of the user to a second resource address; and providing the answer interface at the second resource address.

* * * * *